US010264815B2

(12) United States Patent
Mishra et al.

(10) Patent No.: US 10,264,815 B2
(45) Date of Patent: Apr. 23, 2019

(54) BIOPOLYMER FOAMS AS FILTERS FOR SMOKING ARTICLES

(71) Applicant: Philip Morris USA Inc., Richmond, VA (US)

(72) Inventors: Munmaya K. Mishra, Manakin Sabot, VA (US); Shengsheng Liu, Richmond, VA (US); William R. Sweeney, Richmond, VA (US); Peter J. Lipowicz, Midlothian, VA (US)

(73) Assignee: Philip Morris USA Inc., Richmond, VA (US)

( * ) Notice: Subject to any disclaimer, the term of this patent is extended or adjusted under 35 U.S.C. 154(b) by 425 days.

(21) Appl. No.: 14/968,548

(22) Filed: Dec. 14, 2015

(65) Prior Publication Data

US 2016/0095350 A1    Apr. 7, 2016

Related U.S. Application Data

(62) Division of application No. 13/072,166, filed on Mar. 25, 2011, now Pat. No. 9,226,524.

(Continued)

(51) Int. Cl.
*A24D 3/00* (2006.01)
*A24C 3/00* (2006.01)
(Continued)

(52) U.S. Cl.
CPC ........... *A24D 3/0237* (2013.01); *A24D 1/045* (2013.01); *A24D 3/0229* (2013.01); *A24D 3/066* (2013.01);
(Continued)

(58) Field of Classification Search
CPC .... A24D 3/0237; A24D 1/045; A24D 3/0229; A24D 3/066; A24D 3/08; B29C 47/0042;
(Continued)

(56) References Cited

U.S. PATENT DOCUMENTS 2,928,399 A * 3/1960 Touey ............... A24D 3/14
131/342
3,339,557 A * 9/1967 Karalus ............ A24D 3/061
131/274

(Continued)

FOREIGN PATENT DOCUMENTS

CN    1682614 A    10/2005
EP    0453397 A1    10/1991
(Continued)

OTHER PUBLICATIONS

Partial International Search Report dated Sep. 16, 2011 for PCT/IB2011/001151.
(Continued)

*Primary Examiner* — Linda L Gray
(74) *Attorney, Agent, or Firm* — Buchanan Ingersoll & Rooney LLP

(57) ABSTRACT

A process for preparing a filter plug for a smoking article, such as a cigarette, includes: (a) freeze-drying a solution of a biopolymer to form a structure; and (b) cutting the structure to a predetermined dimension, to thereby prepare a filter plug for a smoking article. Another process for preparing a filter plug for a smoking article, such as a cigarette, includes: (a) extruding a mixture of a foaming agent and a biopolymer comprising a protein to form a structure; and (b) cutting the structure to a predetermined dimension, to thereby form a filter plug for a smoking article.

19 Claims, 1 Drawing Sheet

Agar foam filter

Related U.S. Application Data

(60) Provisional application No. 61/318,265, filed on Mar. 26, 2010.

(51) Int. Cl.
| | |
|---|---|
| *A24D 3/02* | (2006.01) |
| *A24D 3/06* | (2006.01) |
| *A24D 3/08* | (2006.01) |
| *A24D 1/04* | (2006.01) |
| *B29C 47/00* | (2006.01) |
| *A24C 5/47* | (2006.01) |
| *A24C 5/52* | (2006.01) |
| *B29L 31/14* | (2006.01) |
| *B29L 31/00* | (2006.01) |

(52) U.S. Cl.
CPC ............ *A24D 3/08* (2013.01); *B29C 47/0042* (2013.01); *B29C 47/0066* (2013.01); *A24C 3/00* (2013.01); *A24C 5/47* (2013.01); *A24C 5/52* (2013.01); *A24D 3/067* (2013.01); *B29L 2031/14* (2013.01); *B29L 2031/7416* (2013.01); *Y10T 83/041* (2015.04)

(58) Field of Classification Search
CPC ......... B29C 47/0066; A24C 3/00; A24C 5/47; A24C 5/52; B29L 2031/14; B29L 2031/7416; Y10T 83/041
See application file for complete search history.

(56) References Cited

U.S. PATENT DOCUMENTS

| | | | |
|---|---|---|---|
| 3,470,883 A | 10/1969 | Shepherd et al. | |
| 3,632,361 A | 1/1972 | Battista | |
| 3,665,061 A | 5/1972 | Eberly, Jr. | |
| 3,941,858 A * | 3/1976 | Shepherd | A01N 25/10 523/120 |
| 4,756,316 A * | 7/1988 | Keritsis | A24D 3/022 131/94 |
| 4,966,171 A | 10/1990 | Serrano et al. | |
| 5,012,829 A | 5/1991 | Thesing et al. | |
| 5,177,113 A | 1/1993 | Biss et al. | |
| 5,186,185 A | 2/1993 | Mashiko et al. | |
| 5,288,765 A | 2/1994 | Bastioli et al. | |
| 5,292,782 A | 3/1994 | Bastioli et al. | |
| 5,497,793 A * | 3/1996 | Kubica | A24D 3/06 131/331 |
| 5,499,636 A | 3/1996 | Baggett et al. | |
| 5,509,430 A | 4/1996 | Berger | |
| 5,569,969 A | 10/1996 | Kasanami et al. | |
| 5,664,586 A | 9/1997 | Sinclair et al. | |
| 5,666,976 A | 9/1997 | Adams et al. | |
| 5,692,525 A | 12/1997 | Counts et al. | |
| 5,692,526 A | 12/1997 | Adams et al. | |
| 5,709,227 A | 1/1998 | Arzonico et al. | |
| 5,709,934 A | 1/1998 | Bell et al. | |
| 5,738,119 A | 4/1998 | Edwards, III et al. | |
| 5,801,207 A | 9/1998 | Bastioli et al. | |
| 5,817,159 A | 10/1998 | Cahill et al. | |
| 5,839,448 A | 11/1998 | Woodings | |
| 5,856,006 A * | 1/1999 | Asai | A24D 3/065 131/332 |
| 5,911,224 A | 6/1999 | Berger | |
| 5,948,429 A | 9/1999 | Bell et al. | |
| 6,026,820 A | 2/2000 | Bagget, Jr. et al. | |
| 6,062,228 A | 5/2000 | Loercks et al. | |
| 6,096,809 A | 8/2000 | Lorcks et al. | |
| 6,153,292 A | 11/2000 | Bell et al. | |
| 6,251,318 B1 | 6/2001 | Arentsen et al. | |
| 6,325,859 B1 | 12/2001 | De Roos et al. | |
| 6,334,968 B1 | 1/2002 | Shapiro et al. | |
| 7,071,249 B2 | 7/2006 | Ho et al. | |
| 2003/0100635 A1* | 5/2003 | Ho | A24D 3/068 524/47 |
| 2003/0140932 A1 | 7/2003 | Seidel | |
| 2005/0067726 A1 | 3/2005 | Yan et al. | |
| 2006/0124145 A1 | 6/2006 | Schmidt | |
| 2006/0144412 A1 | 7/2006 | Mishra et al. | |
| 2010/0092571 A1 | 4/2010 | Yan et al. | |
| 2010/0166833 A1 | 7/2010 | Gavish | |
| 2011/0111020 A1 | 5/2011 | Yan et al. | |

FOREIGN PATENT DOCUMENTS

| | | |
|---|---|---|
| EP | 0777976 A2 | 6/1997 |
| GB | 1144552 A | 3/1969 |
| GB | 1150192 A | 4/1969 |
| GB | 2205102 A | 11/1988 |
| KR | 2001-044815 A | 6/2001 |
| WO | WO 03/082026 A1 | 10/2003 |
| WO | WO 2005/112671 A1 | 12/2005 |

OTHER PUBLICATIONS

International Search Report and Written Opinion dated Sep. 19, 2011 for PCT/IB2011/001060.

International Search Report and Written Opinion dated Feb. 10, 2012 for PCT/IB2011/001151.

International Preliminary Report on Patentability dated Oct. 2, 2012 for PCT/IB2011/001151.

* cited by examiner

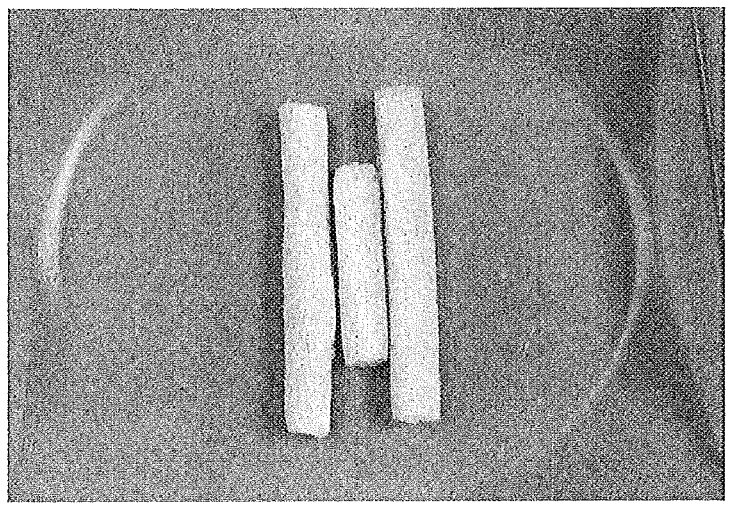
Figure 1. Agar foam filter
Figure 2. Bench top freeze-dryer

BIOPOLYMER FOAMS AS FILTERS FOR SMOKING ARTICLES

CROSS REFERENCE TO RELATED APPLICATION

This application is a divisional of U.S. application Ser. No. 13/072,166, filed on Mar. 25, 2011, which claims priority under 35 U.S.C. § 119(e) to U.S. provisional Application No. 61/318,265, filed on Mar. 26, 2010, the entire content of which is incorporated herein by reference.

BACKGROUND

Cellulose acetate (CA) fibers are often used in producing tobacco smoking filter plugs for smoking articles such as cigarettes. In a conventional process of manufacturing a cigarette filter plug, cellulose acetate fibers are crimped, entangled and bonded to each other by binders such as triacetin (i.e., glycerin triacetate).

After a smoking article is consumed, it is discarded. Typically, cellulose acetate fibers contained in the smoking article degrade slower than tobacco and/or the paper parts of the cigarette article, thereby contributing litter to the environment. To reduce the environmental burden of discarded filtered smoking articles, there is interest in developing cigarette filter plugs having an improved degradation rate.

SUMMARY

According to a first embodiment, a process for preparing a filter plug for a smoking article, such as a cigarette, comprises: (a) freeze-drying a solution of a biopolymer to form a structure; and (b) cutting the structure to a predetermined dimension, to thereby form a filter plug for smoking articles.

According to a second embodiment, a process for preparing a filter plug for a smoking article, such as a cigarette, comprises: (a) extruding a mixture of a foaming agent and a biopolymer comprising a protein to form a structure; and (b) cutting the structure to a predetermined dimension, to thereby form a filter plug for smoking articles.

BRIEF DESCRIPTION OF THE DRAWING

FIG. 1 is a digital image showing agar foam rods prepared by a freeze-drying process.

FIG. 2 is an image of a bench top freeze-dryer.

DETAILED DESCRIPTION

Processes for preparing foams from biopolymers, which are useful as filters for smoking articles such as cigarettes are described herein.

The term "biopolymer," as used herein, is understood by those skilled in the art and generally refers to a special class of polymers produced by living organisms and are biodegradable. A biopolymer may include any polymer (a long repeating chain of atoms) found in nature.

The term "foam," as used herein, denotes a network of communicating micro-compartments with biopolymer molecules and/or filaments interspersed throughout its walls.

The term "smoking article," as used herein, denotes an article containing a charge of smoking composition formed into a rod or column, and which may optionally be surrounded by a wrapper, which helps to hold the shape of the rod and contain the smoking composition within the smoking article. The rod of smoking material, or the wrapper therefor, or both can be burned or heated during use of the smoking article under smoking conditions. A smoking article may also contain one or more filter plugs, which can function to remove targeted constituents from, and provide aesthetically pleasing qualities to, the smoke. The term "smoking article" is intended to include cigarettes, which include both traditional cigarettes and non-traditional cigarettes.

The term "traditional cigarette," as used herein, denotes a cigarette that can be smoked by lighting an end of a wrapped rod or column of a smoking composition and drawing air predominantly through the lit end by suction at a mouthpiece end of the cigarette. Traditional cigarettes often contain a filter element to remove or reduce targeted constituents in the smoke. A filter element typically composed of one or more pieces of filter material wrapped by a wrapper known as a plug wrap, which can typically be attached to one end of the rod of shredded smoking composition (e.g., tobacco, also referred to as a "tobacco rod") by means of a wrapping or tipping material.

In addition, non-traditional cigarettes include, but are not limited to, cigarettes for electrical smoking systems as described in commonly-assigned U.S. Pat. Nos. 6,026,820; 5,692,526; 5,692,525; 5,666,976; and 5,499,636. Other non-traditional cigarettes include those having a fuel element in the tobacco rod as described in U.S. Pat. No. 4,966,171.

As used herein, the term "flavorant" denotes one or more compounds that are perceived by taste receptors or olfactory sensory cells of a consumer, but includes compounds that are perceived by additional senses as well. Suitable flavorants include cycloalkyl alcohols and aryl alcohols, such as menthol, thymol, and eugenol.

In an embodiment, a filter plug for a smoking article comprises a biopolymer foam produced by a freeze-drying process or a blown-foam extrusion process. In a preferred embodiment, the biopolymer comprises a natural biopolymer. Examples of suitable biopolymers include, but are not limited to, polysaccharides and proteins. Specifically, the biopolymer may contain one or more of carrageenan, agar, guar, pectin such as tobacco-sourced pectin, starch, alginate, chitosan, gelatin, wheat protein, rice protein, pea protein, soy protein, fish protein, and the like. These biopolymers may be used individually or in combination thereof.

Freeze-drying (also known as lyophilization) is a dehydration process comprising: (a) freezing a solution of a material in a suitable solvent, e. g., water; (b) then reducing the surrounding pressure to allow the frozen water or other suitable solvent in the material to sublime directly from the solid phase into the gas phrase; and (c) heating the resulting material. The eutectic temperature, that is the minimum freezing point for the entire volume of material being frozen, varies with the concentration of the material in solution. Thus, the freeze-drying conditions, such as temperature and period of time, will vary as a function of the material concentration in solution.

The biopolymer foam can be formed in any dimension and/or shape, either regular or irregular, e. g., by conducting freeze-drying in a container having the desired dimension and/or shape, as long it has a dimension larger than a filter plug for a smoking article.

In one embodiment, the freeze-drying is carried out in a cylindrical container, such as a tube. The cylindrical container preferably has a diameter of about 0.8 cm, which is the same as that of a filter for a smoking article, to thereby produce a biopolymer foam rod.

Various solvents, e. g., water, alcohol, and acetone, isopropyl alcohol, propylene glycol, etc., may be used to prepare the biopolymer solution. In an embodiment, the biopolymer can be dissolved in water to obtain an aqueous solution of biopolymer. The concentration of biopolymer in the aqueous solution preferably is the range from about 0.1% to about 50%, and more preferably, from about 0.5% to about 5%, based on the total weight of the solution. However, the concentration of the biopolymer in the solution can be in the range from about 5% to about 10%, from about 10% to about 20%, from about 20% to about 30%, from about 30% to about 40%, or from about 40% to about 50%, based on the total weight of the solution.

In a particular embodiment with a bench top freeze-dryer, such as that shown in FIG. 2, a 2% aqueous solution of agar in a plastic tube having a diameter of about 0.8 cm can be placed in a flask. The flask can then be connected to vacuum and left overnight. FIG. 1 is a digital image showing the thus-prepared agar foam rods.

In addition, when a larger freeze-dryer is involved, a temperature program may be used. For example, an aqueous solution of a biopolymer may be freeze dried at a temperature ranging from about −40° C. to about −100° C. and under a pressure ranging from about 0.01 mbar to about 0.1 mbar. This freeze-drying may substantially complete in about 1 hour to about 10 hours.

In an embodiment, freeze-drying may be conducted by: (a) cooling a 2% aqueous solution of agar in a plastic tube having a diameter of about 0.8 cm to about −80° C. and maintaining this temperature for about 3 hours; (b) applying a vacuum of about 0.02 mbar; and (c) raising the temperature to about 20° C. and maintaining this temperature for 24 hours.

This freezing-drying-heating cycle may optionally be repeated one or more times. The content of water or other suitable solvent in the final freeze-dried product is preferably in the range of about 1% to about 5%, based on the total weight of the final product.

The blown-foam extrusion process may be performed by various methods. For example, a mixture containing the biopolymer and optionally a foaming agent is passed into or through a heated mold. The foaming agent is not particularly limited. Examples of suitable foaming agent include, but are not limited to, air, $N_2$, $CO_2$, water vapor, sodium bicarbonate, sodium bicarbonate/citric acid, pentane, and cyclopentane. For example, the foaming agent can be used in an amount ranging from about 5% to about 20%, based on the weight of biopolymer.

Alternatively, a mixture containing the biopolymer and optionally a foaming agent is passed into or through a heated mold (extruded) along with an inert gas, such as $CO_2$ and $N_2$. The inert gas may be introduced at a rate of about 15%.

The temperature of the mold may vary depending on various factors, e. g., the types of biopolymer and solvent utilized. For example, the temperature of the mold can be set at about 100° C. to about 250° C., and preferably, from about 150° C. to about 180° C.

The biopolymer foam can be formed by a blown-foam extrusion process in any dimension and/or shape, either regular or irregular, by employing a mold of the desired cross-section or diameter, as long it has a dimension larger than a filter plug for a smoking article.

In one embodiment, the mixture containing the biopolymer is passed into or through a mold having a diameter of about 0.8 cm, which is the same as that of a filter for a smoking article, to thereby produce a biopolymer foam rod.

The resulting biopolymer foam, obtained by either freeze-drying or blown-foam extrusion, preferably has an average pore size ranging from about 0.04 millimeters to about 0.20 millimeters, thereby allowing passage of smoke components during smoking and further improving biodegradability upon disposal.

Moreover, the biopolymer foam can be engineered with desired water solubility, so as to delay premature degradation thereof during the uses. The solubility of the biopolymer foam may be manipulated by various methods, e. g., by incorporating one or more water insoluble copolymers, such as cellulose acetate. For example, a water insoluble copolymer may be incorporated in an amount ranging from about 0.1% to about 10%, based on the weight of the biopolymer.

Other properties of the biopolymer foams, e. g., hardness and elasticity, can also be controlled by using various cross-linking agents or mixed biopolymer systems, or the use of specific types of biopolymers or plasticizers. These properties of the biopolymer foams can control the permeability and release characteristics thereof and thus may be adjusted according to end uses.

Other additives, such as calcium carbonate or other salts, and clay, may also be added to the biopolymer foams in an amount which does not adversely affect the characteristics of the biopolymer foams.

The biopolymer may be cross-linked to produce a cross-linked biopolymer foam. The cross-linking can be performed in presence of a cross-linking agent and/or by radiation, e. g., ultraviolet radiation at a wavelength of about 254 nm, either before, during and/or after the freeze-drying or blown-foam extrusion procedure. Cross-linking can be performed prior to, during or subsequent to the freeze-drying.

A cross-linking agent is a compound which contains the appropriate functional groups to react with the free functional groups, e.g., between polymer molecules. The cross-linking agents are not particularly limited as long as they are capable of cross-linking the biopolymer.

Examples of suitable cross-linking agents include, but are not limited to, (a) polyfunctional acids (two or more carboxylic groups); (b) acid chlorides of polyfunctional carboxylic acids (e.g., adipoyl chloride); (c) acid anhydrides of polyfunctional carboxylic acids; (d) carbonyl chloride; (e) aldehydes and dialdehydes; (f) $(NH_4)_2HPO_4$; (g) ketenes; (h) lactones; (i) azides and diazides; (j) aldehydic and keto sugars (glucose, fructose, dextrose, etc.); (k) polybasic inorganic acids and salts thereof; and (l) amides. Bi- or trivalent metal ion salts can also be used as cross-linking agents. For example, cross-linking agents may contain alkaline salts and particularly, salts of alkaline earth metals. These cross-linking agents may be used individually or in combination thereof.

Preferred polyfunctional carboxylic acids include citric, maleic, malic, malonic, ethylenediamine tetracetic, polymannuronic, polygalacturonic, adipic, azelaic, tartaric and succinic acids.

Preferred polybasic inorganic acids include phosphoric, hypophosphorous and sulfuric acids and the ammonium and alkali metal salts thereof.

In one embodiment, the cross-linking agent comprises calcium chloride or calcium lactate.

The amount of cross-linking agent for preparation of the cross-linked biopolymer foam may vary depending on the composition used, in particular, the biopolymer contained therein. For example, the cross-linking agent can be used in an amount of about 0.2% to about 15%, and preferably, about 2%, based on the amount of the biopolymer.

Further, a mixture of biopolymers may be used to form the biopolymer foam. In one embodiment, one or more natural biopolymers may be used in combination with one or more synthetic biopolymers to produce a foam with desired textures. Examples of suitable synthetic biopolymers include, but are not limited to, poly(vinyl alcohol), poly(ethylene glycol) and the like. The ratio of natural biopolymer:synthetic biopolymer may range from about 0% to about 100%. In an embodiment, the natural biopolymer:synthetic biopolymer ratio is from about 1% to about 20%, from about 20% to about 40%, from about 40% to about 60%, from about 60% to about 80%, or from about 80% to about 99%.

Moreover, one or more biopolymers may optionally be used in combination with a plasticizer to form a foam. The presence of a plasticizer can, to some extent, alter foam structures and/or textures. The plasticizer is not particularly limited. Examples of suitable plasticizers include, but are not limited to, certain tobacco extracts, monobasic, dibasic and tribasic acids such as lactic, malic, tartaric and citric, butylene glycols, sorbitol, sorbitan, sucrose, oligosaccharides, triglyceride fats and oils, long chain fatty alcohols, linear paraffins, normal paraffins, paraffin waxes, beeswax, candelilla wax, carnauba wax and sugar cane wax. These plasticizers may be used individually or in combination thereof. The plasticizer, when employed, can be contained in an amount ranging from about 0.5 parts (by weight) to about 100 parts, and preferably, about 0.5 parts (by weight) to about 20 parts, per 100 parts of the biopolymer.

The biopolymer foams may also be engineered to contain further channels, voids and/or cavities therein, to increase the surface areas thereof. For example, small objects may be included in a solution for freeze-drying process or a mixture for blown-foam extrusion process, and subsequently removed after formation of the biopolymer foam. Alternatively or additionally, dies with different cross-section and/or shapes may be employed in a blown-foam extrusion process to produce the biopolymer foam.

The resulting biopolymer foam can then be cut into a dimension and/or shape which is suitable for use in a filter of smoking articles. In one embodiment, a biopolymer foam rod can be cut into a predetermined length, thereby producing one or more filter plugs for smoking articles. In another embodiment, the biopolymer foam is in the form of a sheet, the thickness of which is the same as the length of the desired filter plug. Such biopolymer foam can be stamped with a tube mold having a desired diameter to thereby form a filter plug.

The biopolymer foams can have a high surface area platelet microstructure which is rich in functional bonding sites and can serve as a support for active surface chemistry or modified for selective filtration.

Moreover, the foam structure can physically capture and include other fibrous, ground or granular materials such as cellulose or cellulose acetate for chemical or taste compatibility. In addition, sorbents, such as active carbon, may be incorporated into the biopolymer foams in a filter for smoking articles in an appropriate amount, to remove targeted components from smoke. The sorbent can be incorporated in the foam structure prior to, during or subsequent to the freeze-drying.

Further, the biopolymer foams can be flavored or impregnated with aromas and function for flavor capture/release as desired. For example, a flavorant, in gaseous, solid or liquid form, can be added to a biopolymer solution prior to or during the formation of the biopolymer foam. Alternatively, a flavorant in solid or liquid form, e. g., by soaking, spraying and dropping, to may be incorporated to the formed biopolymer foam.

In one embodiment, a flavorant is incorporated into the biopolymer foam subsequent to the formation thereof, as such the flavorant is adsorbed or absorbed merely on surfaces of the foam. In addition, by incorporation of the flavorant subsequent to the foam formation, potential loss of the flavorant during the foam formation can be avoided or reduced. The amount of flavorant incorporated may vary depending on the type of the flavorant and desired experiences.

The flavorants which can be incorporated in the biopolymer foam are not particularly limited. Examples of suitable flavorants include, but are not limited to, menthol, peppermint, spearmint, wintergreen, cinnamon, chocolate, vanillin, licorice, clove, anise, sandalwood, geranium, rose oil, vanilla, lemon oil, cassia, fennel, ginger, ethyl acetate, isoamyl acetate, propyl isobutyrate, isobutyl butyrate, ethyl butyrate, ethyl valerate, benzyl formate, limonene, cymene, pinene, linalool, geraniol, citronellol, citral, peppermint oil, orange oil, coriander oil, borneol, fruit extract, tobacco flavor, e.g., tobacco extract, and the like. These flavorants may be used individually or in combination thereof. A preferred flavorant comprises menthol.

The filter plug described above can be incorporated in cigarettes. The tobaccos used in these cigarettes are not particularly limited. Examples of suitable types of tobacco materials include, but are not limited to, flue-cured tobacco, Burley tobacco, Maryland tobacco, Oriental tobacco, rare tobacco, specialty tobacco, reconstituted tobacco, agglomerated tobacco fines, blends thereof, and the like. Preferably, the tobacco material is pasteurized. Some or all of the tobacco material may be fermented.

Further, the tobacco material may be provided in any suitable form. Examples of suitable forms include shreds and/or particles of tobacco lamina, processed tobacco materials, such as volume expanded or puffed tobacco, or ground tobacco, processed tobacco stems, such as cut-rolled or cut-puffed stems, reconstituted tobacco materials, blends thereof, and the like. Genetically modified tobacco may also be used.

The biopolymer foam, when used in filters for smoking articles, such as cigarettes, can have accelerated biodegradation rates in comparison with cellulose acetate filters.

A specific non-limiting example is provided below.

EXAMPLE

Preparation of Agar Foam Rods as Cigarette Filters

A mixture of agar (2.0 g) and de-ionized (DI) water (98 g) is heated to 100° C. until agar is completely dissolved and a clear solution is formed. Plastic tubing of appropriate cigarette filter diameter is filled with the hot agar solution and then cooled down to room temperature. The resulting gel is frozen at −80° C. for 3 hours and then freeze-dried for 24 hours at a pressure of 0.02 mbar. The freeze-dried agar foam is warmed to room temperature. The foam rods are removed from the plastic tubing and cut to appropriate length for use as cigarette filters.

While the foregoing has been described in detail with reference to specific embodiments thereof, it will be apparent to one skilled in the art that various changes and modifications may be made, and equivalents thereof employed, without departing from the scope of the claims.

All of the above-mentioned references are herein incorporated by reference in their entirety to the same extent as if each individual reference was specifically and individually indicated to be incorporated herein by reference in its entirety.

We claim:

1. A process for preparing a filter plug for a smoking article, comprising:
   (a) extruding a mixture of a foaming agent and a biopolymer to form a biopolymer foam rod structure; and
   (b) cutting the structure to a predetermined dimension, to thereby form a filter plug for a smoking article,
   wherein the biopolymer is at least one selected from the group consisting of carrageenan, agar, guar, pectin, alginate and chitosan, and the process further comprises cross-linking the biopolymer, prior to, during or subsequent to the extruding.

2. The process of claim 1, wherein the biopolymer further comprises a synthetic biopolymer.

3. The process of claim 2, wherein the synthetic biopolymer is at least one selected from the group consisting of poly(vinyl alcohol) and poly(ethylene glycol).

4. A process for preparing a filter plug for a smoking article, comprising:
   (a) extruding a mixture of a foaming agent and a biopolymer to form a biopolymer foam rod structure; and
   (b) cutting the structure to a predetermined dimension, to thereby form a filter plug for a smoking article,
   wherein the biopolymer is at least one selected from the group consisting of wheat protein, rice protein, pea protein, soy protein, and fish protein, and the process further comprises cross-linking the biopolymer, prior to, during or subsequent to the extruding.

5. The process of claim 1, wherein the foaming agent is contained in an amount ranging from about 5% to about 20%, based on the weight of the biopolymer.

6. The process of claim 1, wherein the extruding (a) is carried out at a temperature ranging from about 100° C. to about 250° C.

7. The process of claim 1, wherein the mixture further comprises: (i) a plasticizer and (ii) a water insoluble copolymer.

8. The process of claim 7, wherein: (i) the plasticizer is contained in an amount ranging from about 0.5 parts to about 100 parts, by weight, per 100 parts of the biopolymer and (ii) the water insoluble copolymer is contained in an amount ranging from about 0.1% to about 10%, based on the weight of the biopolymer.

9. The process of claim 1, further comprising incorporating a flavorant compound and/or a sorbent, prior to, during or subsequent to the extruding (a).

10. The process of claim 1, wherein the mixture includes at least one cross-linking agent in an amount of about 1% to about 15% based on the amount of the biopolymer.

11. The process of claim 1, wherein the foaming agent comprises air, $N_2$, $CO_2$, water vapor, sodium bicarbonate, sodium bicarbonate/citric acid, pentane, or cyclopentane.

12. The process of claim 1, wherein the foaming agent comprises $CO_2$, sodium bicarbonate, sodium bicarbonate/citric acid, pentane, or cyclopentane.

13. A process for preparing a filter plug for a smoking article, comprising:
   (a) extruding a mixture of a foaming agent and a biopolymer to form a structure; and
   (b) cutting the structure to a predetermined dimension, to thereby form a filter plug for a smoking article,
   wherein the biopolymer comprises carrageenan, agar, guar, pectin, alginate or chitosan, and radiating the biopolymer to produce a cross-linked biopolymer.

14. The process of claim 13, comprising radiating the biopolymer at a wavelength of about 254 nm.

15. The process of claim 4, wherein the biopolymer further comprises a synthetic biopolymer.

16. The process of claim 15, wherein the synthetic biopolymer is at least one selected from the group consisting of poly(vinyl alcohol) and poly(ethylene glycol).

17. The process of claim 4, wherein the foaming agent comprises air, $N_2$, $CO_2$, water vapor, sodium bicarbonate, sodium bicarbonate/citric acid, pentane, or cyclopentane.

18. The process of claim 4, wherein the foaming agent comprises $CO_2$, sodium bicarbonate, sodium bicarbonate/citric acid, pentane, or cyclopentane.

19. A process for preparing a filter plug for a smoking article, comprising:
   (a) extruding a mixture of a foaming agent and a biopolymer to form a structure; and
   (b) cutting the structure to a predetermined dimension, to thereby form a filter plug for a smoking article,
   wherein the biopolymer is at least one selected from the group consisting of wheat protein, rice protein, pea protein, soy protein, and fish protein, and radiating the biopolymer to produce a cross-linked biopolymer.

* * * * *